(12) United States Patent
Hosomizu (10) Patent No.: US 7,355,585 B2
(45) Date of Patent: Apr. 8, 2008

(54) INPUT DEVICE AND INFORMATION PROCESSING APPARATUS WITH SUCH INPUT DEVICE AND CURSOR DISPLAY CONTROL METHOD

(75) Inventor: Toshio Hosomizu, Tokyo (JP)

(73) Assignee: TEAC Corporation (JP)

( * ) Notice: Subject to any disclaimer, the term of this patent is extended or adjusted under 35 U.S.C. 154(b) by 221 days.

(21) Appl. No.: 10/259,575

(22) Filed: Sep. 26, 2002

(65) Prior Publication Data
US 2003/0058217 A1    Mar. 27, 2003

(30) Foreign Application Priority Data
Sep. 26, 2001    (JP) .............................. 2001-294688

(51) Int. Cl.
*G09G 5/08*    (2006.01)
(52) U.S. Cl. ...................... 345/157; 345/157; 345/159; 345/160; 345/183; 345/184
(58) Field of Classification Search ................ 345/160, 345/159, 156, 157, 184, 183
See application file for complete search history.

(56) References Cited

U.S. PATENT DOCUMENTS

| | | | | |
|---|---|---|---|---|
| 5,438,331 A | * | 8/1995 | Gilligan et al. ............... | 341/35 |
| 5,572,443 A | * | 11/1996 | Emoto et al. ................ | 702/103 |
| 5,675,360 A | * | 10/1997 | Takegoshi et al. .......... | 345/167 |
| 5,931,873 A | * | 8/1999 | Cisar .............................. | 701/1 |
| 6,546,231 B1 | * | 4/2003 | Someya et al. .......... | 455/550.1 |
| 6,707,445 B1 | * | 3/2004 | Hasemann ................... | 345/157 |
| 6,717,571 B2 | * | 4/2004 | Chen ........................... | 345/157 |

FOREIGN PATENT DOCUMENTS

JP    60-198629 A    * 10/1985

OTHER PUBLICATIONS

IBM Technical Disclosure Bulletin NN9102428, Feb. 1991, US Enlarged Cursor Key With Trackball.*

* cited by examiner

*Primary Examiner*—Richard Hjerpe
*Assistant Examiner*—Leonid Shapiro
(74) *Attorney, Agent, or Firm*—Anderson Kill & Olick, PC

(57) ABSTRACT

An input device may be used with the information processing apparatus and the like, and provides an improved ease of operation in moving the cursor on the display screen.

The input device includes a set of cursor keys 1 that, when activated, cause the cursor to move on a display section 8, a cursor key activation detect means 2, a rotary operation device 3, a rotary operation device activation detect means 4, and a cursor movement information generator means 5 that responds to the detect results from the cursor key activation detect means 2 and from the rotary operation device activation detect means 4, and provides respective output signals that cause the cursor to move as indicated by the received detect results, depending upon whether only the cursor keys are activated or both the cursor keys and the rotary operation device are activated.

Using the input device allows the operator to cause the cursor to move around and across the display screen, quickly and/or with any speed specified by the operator.

14 Claims, 4 Drawing Sheets

INPUT DEVICE AND INFORMATION PROCESSING APPARATUS WITH SUCH INPUT DEVICE AND CURSOR DISPLAY CONTROL METHOD

TECHNICAL FIELD

The present invention relates to the information processing technology, wherein an input device is used with an information processing apparatus and the like to control the movement of a cursor on the display screen.

BACKGROUND OF THE INVENTION

In the information processing apparatus, the information such as text characters, graphical images and the like may be displayed on the display screen (LCD, CRT, etc.), and a cursor may also appear together with such information, wherein the cursor may be moved to any particular location on the display screen, and may be used to select any particular menu item for display. The information processing apparatus may be equipped with a cursor operation device, such as a set of cursor-movement keys (arrow keys), that, when activated, causes the cursor to be moved in any desired direction on the screen. As the cursor is moving in a particular direction, the current display may be refreshed (for example, the cursor moves to another location, the screen is scrolled, and so on). The cursor-movement keys on the apparatus have the respective functions assigned that, when be activated, cause the cursor to be moved in the respective directions. Specifically, the cursor-movement keys usually include four arrow keys that allow the cursor to be moved in four directions (UP, DOWN, RIGHT, LEFT). The direction in which the cursor is moving and the speed with which the cursor is moving may previously be set for each of the arrow keys.

When the cursor has to be moving largely to a target line because a great number of lines, from which a particular line must be selected by the cursor, appear on one window, it is desirable that the cursor should be moving quickly to the target line. To respond to this desire, the cursor may be moving quickly in several ways.

(1) To depress a particular cursor key and hold it depressed. The cursor may be moving more quickly.

(2) To keep a particular cursor key depressed while holding Shift key depressed. The cursor may be moving more quickly.

(3) To keep a particular arrow key depressed, and then keep the reverse arrow key depressed. The cursor may be moving more quickly.

Any of the above ways has the problem in that the user cannot control the cursor moving speed as the user desires. The cursor may be moving too quickly, or the cursor may be moving too slowly.

The small-sized information processing apparatus, such as hand-held portable computers, portable MD players, portable CD players, MP3 players and the like, may include, in addition to the cursor-movement keys, a rotary operation device (also called a jog dial) that helps the user operation with the higher efficiency. This rotary operation device has attracted the attention of the inventors of the current application, who have discovered that the cursor may be moved as desired by using the cursor-movement keys in combination with the rotary operation device. The present invention is based on the above discovery.

SUMMARY OF THE INVENTION

In order to solve the problems of the prior art described above, several aspects of the present invention are provided. Specifically, according to one aspect of the present invention as defined in claim 1, an input device is provided, wherein the input device includes a set of cursor-movement keys (or simply cursor keys) that, when activated, cause the cursor to move across the screen, a cursor key activation detect means for detecting the activation of any cursor key, a rotary operation device for performing the input operations through its rotation, a rotary operation device activation detect means for detecting the activation of the rotary operation device, and a cursor movement information generator means for receiving the detect results from the cursor key activation detect means and from the rotary operation device activation detect means, and providing respective output signals that cause the cursor to move as indicated by the detect results, depending upon whether only the cursor keys are activated or both the cursor keys and the rotary operation device are activated.

According to another aspect of the present invention as defined in claim 2, the input device as defined in claim 1 is provided, wherein the set of cursor movement keys include several arrow keys that, when activated, cause the cursor to move in the respective directions as indicated by the arrow keys.

According to still another aspect of the present invention as defined in claim 3 or 4, the input device as defined in claims 1 or 2, wherein the rotary operation device has the rotary disc form, and can be operated to rotate in the clockwise direction and in the counterclockwise direction, and wherein the rotary operation device activation detect means responds to the activation of the rotary operation device for detecting the direction in which the rotary operation device is rotated, how much it is rotated, and how quickly it is rotated.

According to a further aspect of the present invention as defined in claim 5, 8, 9 the input device as defined in any of claims 1 through 4 or 6, 7, wherein the cursor movement information generator means is responsive to the rotary operation device that is operated to rotate in the clockwise direction or in the counterclockwise direction, in which one direction is defined as the forward direction and the other direction is defined as the reverse direction, and, when the rotary operation device is operated to rotate in the forward direction, provides output signals that cause the cursor to move in the respective directions as indicated by the cursor keys, and, when the rotary operation device is operated to rotate in the reverse direction, provides output signals that cause the cursor to move in the directions opposite the respective directions as indicated by the cursor keys.

According to another aspect of the present invention as defined in claim 6, the input device as defined in any of claims 1 through 4, wherein the cursor movement information generator means responds to the detect results received from the cursor key activation detect means, and provides output signals that cause the cursor to move in the respective directions as indicated by the received detect results, and wherein, when the detect results are received both from the cursor key activation detect means and from the rotary operation activation detect means, the cursor movement information generator means responds to the received detect results, and provides the instructions that cause the cursor to move more quickly and/or more largely, as indicated by the received detect results.

According to another aspect of the present invention as defined in claim 7, the input device as defined in any of claims 6 is provided, wherein the speed with which the cursor is moving and/or the amount by which the cursor is moving become the quicker and/or larger as the rotary operation device is rotated the more quickly and/or more largely.

According to a further aspect of the present invention as defined in claims 10 through 18, an information processing apparatus is provided, wherein the information processing apparatus includes the input device as defined in any of claims 1 through 9, a display means that displays the cursor on the display screen, together with the information such as text characters, graphical images and the like, and a cursor movement instructing means responsive to the output of the cursor movement information generator means included in the input device for providing instructions to the display means that cause the cursor to move on the screen.

According to still another aspect of the present invention as defined in claim 19, a cursor display method is provided, wherein the method comprises the steps of displaying the cursor on the screen together with the information such as text characters, graphical images and the like, detecting when the cursor keys are activated to cause the cursor to move and when the rotary operation device is operated to cause the cursor to rotate, and, when it is determined at the detecting step that only the cursor keys are activated, moving the cursor as instructed by the cursor keys, and, when it is determined at the detecting step that both the cursor keys and the rotary operation device are activated, moving the cursor as instructed by both the cursor keys and the rotary operation device and refreshing the current display as the cursor is moving as instructed.

According to another aspect of the invention as defined in claim 20, the cursor display method as defined in claim 19 is provided, wherein the cursor moving step includes, when both the cursor keys and the rotary operation device are activated, the step of causing the cursor to move more quickly in the respective directions as indicated by the cursor keys when the rotary operation device is operated to rotate in the forward direction, and the step of causing the cursor to move more quickly in the directions opposite the respective directions as indicated by the cursor keys when the rotary operation device is operated to rotate in the reverse direction.

According to a further aspect of the present invention as defined in claim 21, the cursor display method as defined in claim 19 or 20 is provided, wherein the cursor is moving with the rotary motion of the rotary operation device, and is moving the more quickly as the rotary operation device is rotating the more quickly.

More specifically, in the input device according to the first aspect of the present invention as defined in claim 1, when any of the cursor keys is activated by the operator, this activation may be detected by the cursor key activation detect means, and when the rotary operation device is operated by the operator, this operation may be detected by the rotary operation device activation detect means. In response, the cursor movement information generator means may be operated to provide output signals that cause the cursor to move in the usual manner when only the cursor keys are activated, and to provide output signals that cause the cursor to move differently from the usual manner when both the cursor keys and rotary operation device are activated. Preferably, as defined in claim 5, the cursor may be moving more quickly and/or more largely when both the cursor keys and rotary operation device are activated than when the cursor keys alone are activated. In this case, the cursor movement information generator means may provide output signals associated with the activation of the cursor keys as well as output signals that cause the cursor to move more quickly, or may provide output signals that reflect any change in the cursor moving speed.

As defined in claim 6, the cursor should preferably be moving the more quickly and more largely as the rotary operation device is rotated the more quickly and more largely. For example, the cursor may be moving the more quickly as the rotary operation device is rotated the more quickly, and may be moving the more largely as the rotary operation device is rotated the more largely. The cursor movement may be controlled in accordance with the rotation speed of the rotary operation device, wherein this particular control may be terminated when the operation of the rotary operation device ends, and may be passed to the cursor keys. Similarly, the cursor movement may be controlled in accordance with the rotation amount of the rotary operation device, wherein this particular control may be terminated when the cursor has moved over a predefined distance or when the cursor has moved for a predefined period of time. For example, when the cursor should be moving more quickly, depending upon how much the rotary operation device is rotated, the cursor movement may be controlled so that the cursor can only be moving during a predefined period of time or during the period of time corresponding to the rotation amount of the rotary operation device. When the cursor should be moving more largely, depending how much the rotary operation device is rotated, the control may be terminated after the cursor has moved over a predefined distance.

The information processing apparatus according to the present invention includes the input device described above, and in response to output signals that are received when both the cursor keys and rotary operation device are activated and that instruct the apparatus that the cursor should be moving, the apparatus may cause the cursor to move with the speed and over the distance as instructed by the output signals on the screen. This ensures that the cursor movement occurs with higher efficiency and that the cursor always appears on the screen.

In the cursor display method according to the present invention, when the cursor keys and/or the rotary operation device are activated with the information and the cursor being displayed on the screen, the activation may be detected, wherein when both the cursor keys and rotary operation device are activated, the cursor may be moved in a different manner from the manner in which the cursor is moved when only the cursor keys are activated, causing the current display to be refreshed. This combination of the cursor keys and rotary operation device ensures that the cursor can be moving across the screen with a higher efficiency and that the cursor movement can always be reflected on the screen by refreshing the display.

DETAILED DESCRIPTION OF THE INVENTION

Now, one embodiment of the present invention is described by referring to the accompanying drawings.

Figure 1:
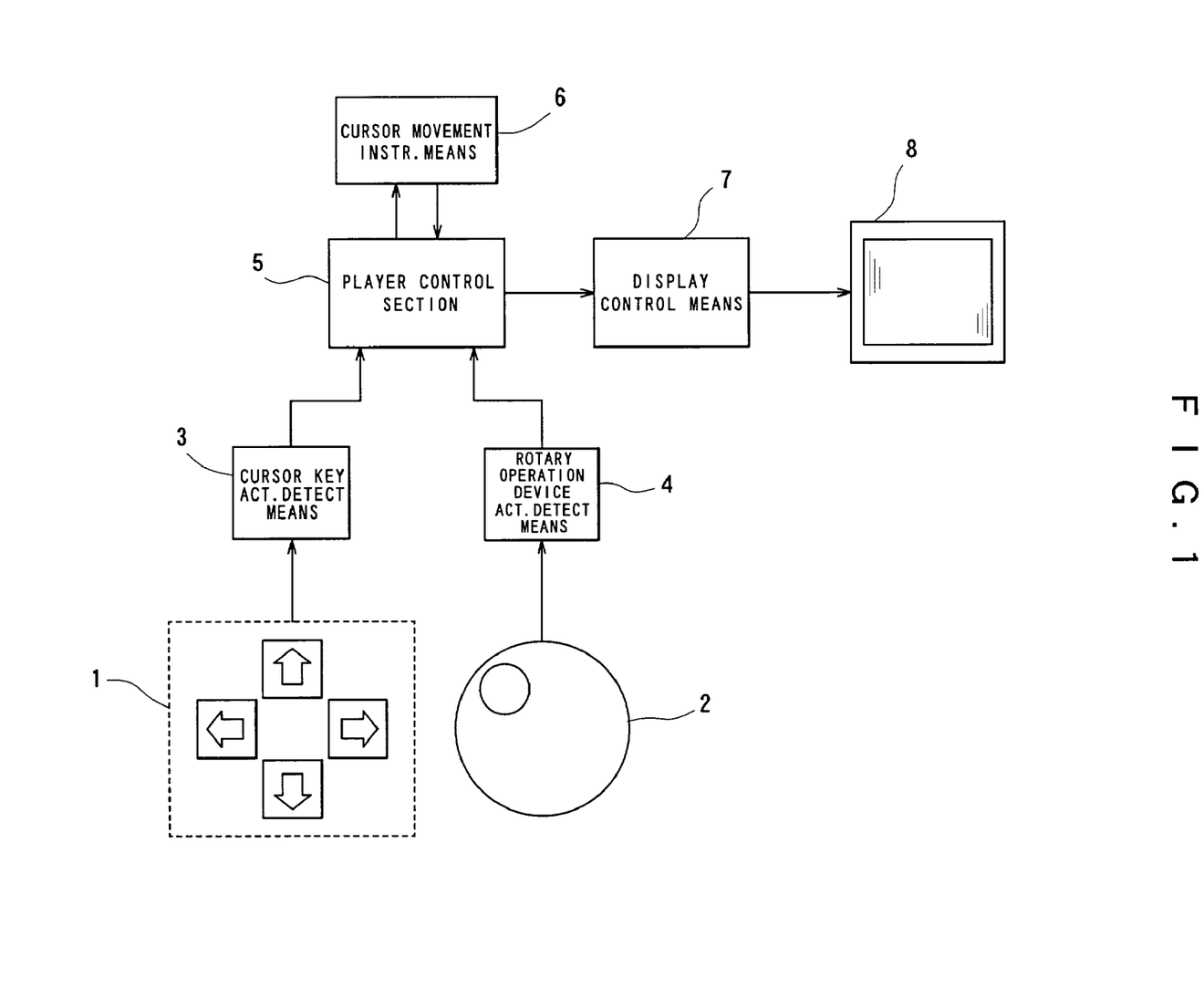
FIG. 1 is a block diagram illustrating one embodiment of the present invention.

The information processing apparatus according to this embodiment represents an MP3 player, which has a set of cursor keys, as generally represented by 1, including four arrow keys (UP, DOWN, RIGHT, LEFT), and a rotation operation device 2. The set of cursor keys 1 is coupled to cursor key activation detect means 3, and the rotary operation device 2 is coupled to rotary operation device activation detect means 4. When any of the arrow keys is depressed, this is encoded by the cursor key activation detect means 3, which detects that the key is activated. When the rotary operation device 2 is operated to rotate in a particular direction and with a particular speed, this is encoded by the rotary operation device activation detect means 4, which detects that the rotary operation device is rotated in that direction and with that speed.

The cursor key activation detect means 3 and the rotary operation device activation detect means 4 are connected to a player control section 5, which functions as the cursor movement information generator means that receives the respective outputs from the cursor key activation detect means 3 and from the rotary operation device activation detect means 4. In response, the player control section 5 may determine the cursor moving direction and speed from the above outputs, and provide the cursor movement information as output. The cursor keys 1 are defined as the initial cursor movement information so that, when each cursor key is depressed, it causes the cursor to move in the direction as defined by the cursor key. In this embodiment, the cursor keys 1 are defined so that, when a cursor key is depressed, it causes the cursor to move in the direction as indicated by the arrow labeled on that cursor key (arrow key). The cursor keys 1 are also defined so that, when a cursor key is depressed, it causes the cursor to move on the screen with the speed as defined by the cursor key. The initial cursor moving speed as defined by the cursor keys 1 may be overridden by the operator.

The cursor keys 1, rotary operation device 2, cursor key activation detect means 3, rotary operation device activation detect means 4, and player control section 5 that have been described above constitutes the input device according to the present invention.

To the player control section 5 is coupled a cursor movement instruction generating means 6 that responds to the cursor movement information for providing a cursor movement instruction. To the player control section 5 is also coupled a display control section 7 that receives an instruction from the cursor movement instruction generating means 6 via the player control section 5. To the display control section 7 is coupled a display section 8 including LCD (liquid crystal display) on which the display may appear under control of the display control section 7. The display control section 7 and the display section 8 constitute a display means.

It should be understood that each of the player control section 5, cursor movement instruction generating means 6 and display control section 7 may include a CPU (central processing unit) or processor and a storage medium such as ROM on which respective programs are recorded, although those are not shown. The player control section 5 that provides the functions described above may also control each element of the MP3 player, and may accept any musical data and reproduce it.

Except for the elements that have been described above, other elements may be configured. As those other elements are known in the art, no further explanation is provided.

Figure 2:
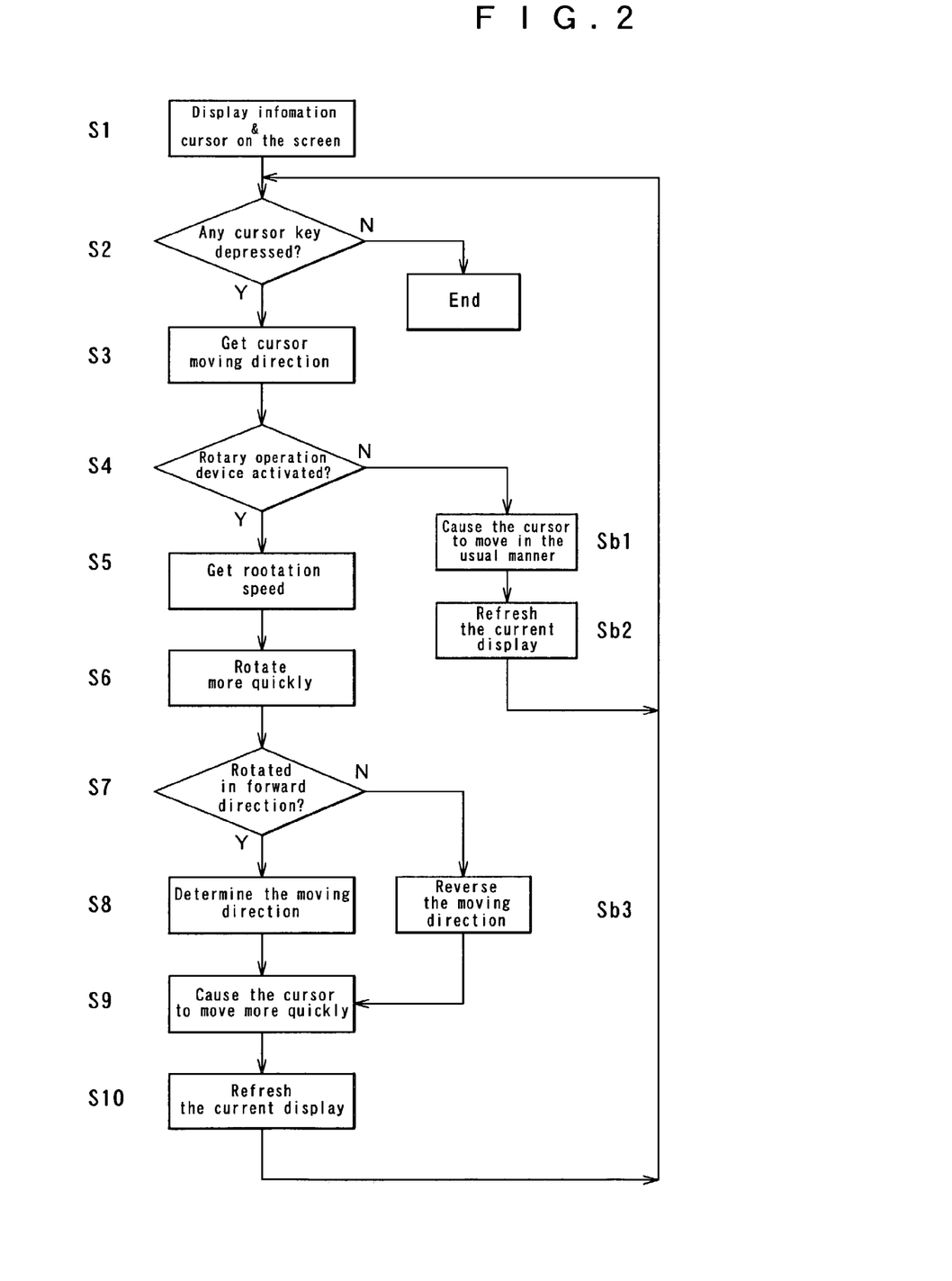
FIG. 2 is a flowchart illustrating the step-by-step cursor display procedure in accordance with one embodiment of the present invention.

The cursor display control method is now described by referring to the flowchart shown in FIG. 2.

The player control section 5 may control the display control section 7 as required so that the information such as text characters, graphical images and the like, as well as the cursor, may be displayed on the display section 8. The present invention is not limited to any particular cursor display method, but may employ any cursor-sensitive methods. As shown in the upper parts of FIGS. 3 and 4, the text information 10 such as "ABC . . . " and an arrow cursor 11 appear on the display section 8 (step S1).

Figure 3:
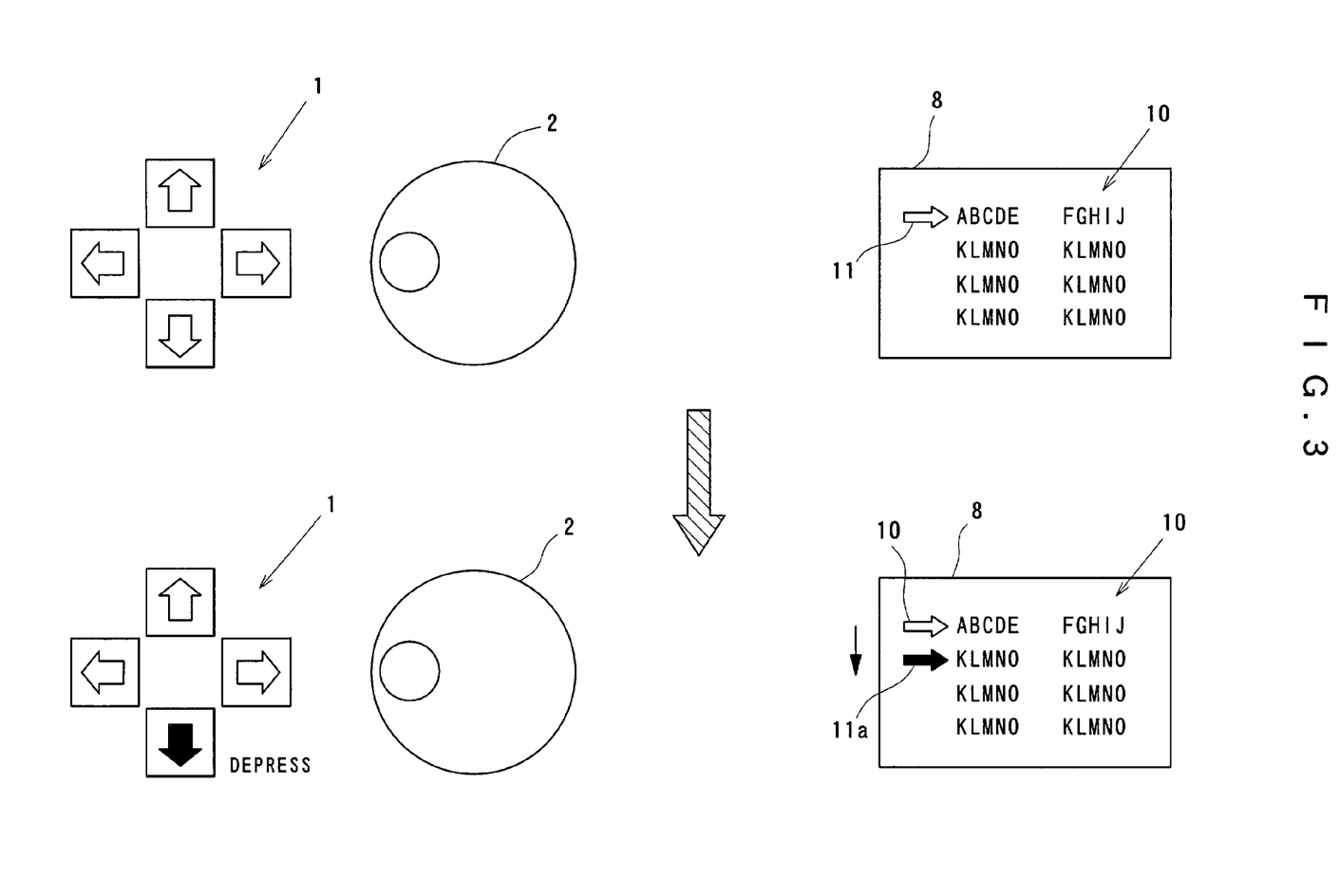
FIG. 3 illustrates how the cursor is moving on the screen when the cursor keys and the rotary operation device are activated in accordance with one embodiment of the present invention.
Figure 4:
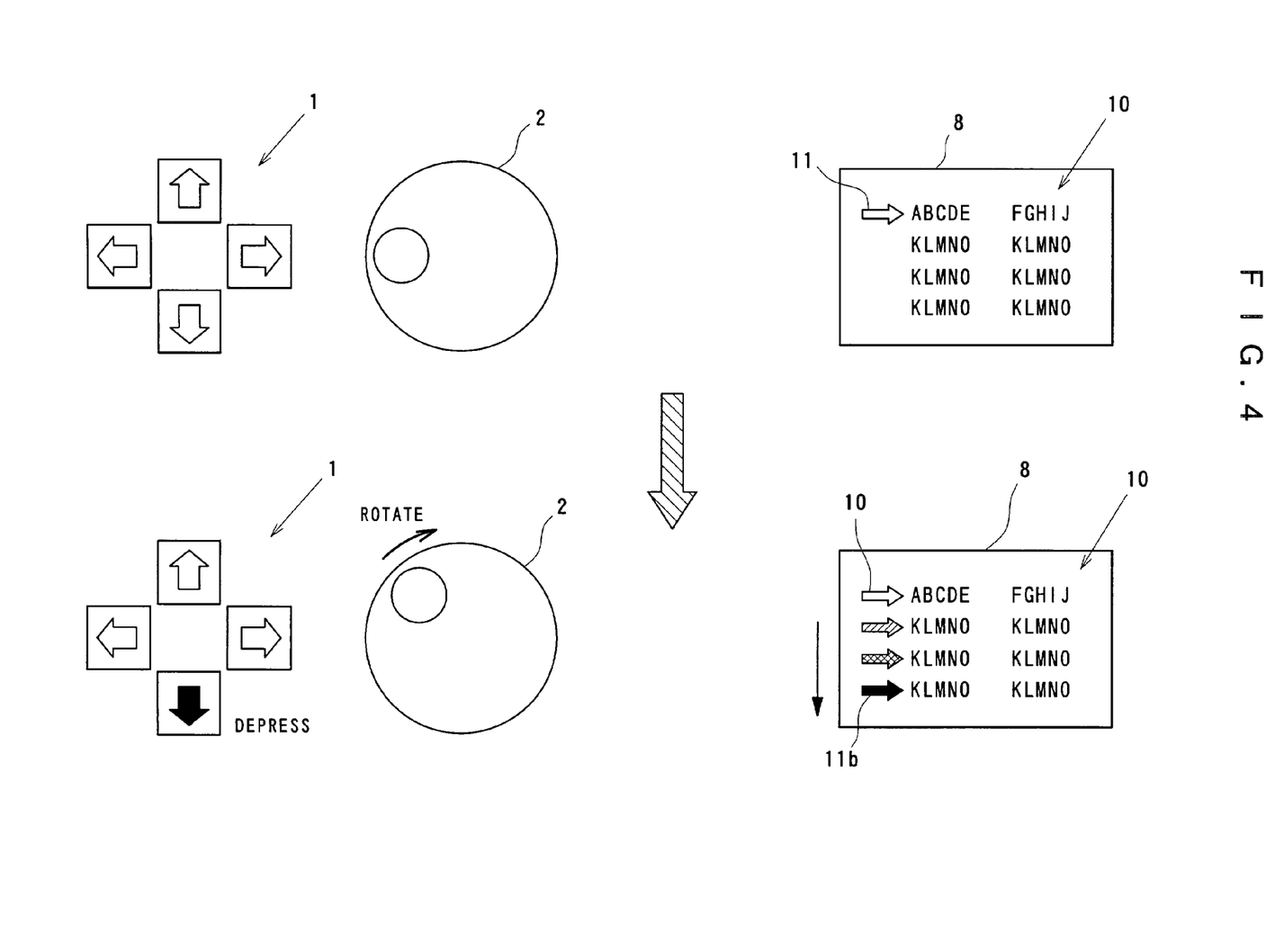
FIG. 4 also illustrates how the cursor is moving on the screen when the cursor keys and the rotary operation device are activated in accordance with one embodiment of the present invention.

In the state shown in FIGS. 3 and 4, the player control section 5 may check the output from the cursor key activation detect means 3 to determine whether any arrow key has been depressed (step S2). If no arrow key has been depressed, the cursor display control process ends. If any arrow key has been depressed, the player control section 5 may determine what arrow key has been depressed from the output from the cursor key activation detect means 3, and may also identify the direction in which the cursor should be moved (step S3). If it is determined that any arrow key has been depressed, then the player control section 5 may check the detect results from the rotary operation device activation detect means 4 to determine whether the rotary operation device 2 has been activated (step S4).

If it is determined at step S4 that the rotary operation device 2 has not been activated, the player control section 5 determines that only the cursor key has been activated. Then, the process proceeds to step Sb1, where the player control section 5 sends the information to the cursor movement instruction generating means 6. Based on the cursor moving speed that has initially been defined, this information specifies the direction in which the cursor should be moving and the speed with which it should be moving. The cursor movement instruction generating means 6 may generate an appropriate instruction in response to the above information, which may be sent to the player control means 5. This instruction may be passed from the player control means 5 to the display control section 7 that causes the cursor to move as specified by this cursor moving instruction. Then, the process proceeds to step Sb2, where the current display may be refreshed accordingly. After the current display is refreshed at step Sb2, the process goes back to step S2, where it is determined again that any cursor key has been depressed, and then the sequence described above may be repeated. The lower parts of FIG. 3 show the display that has been refreshed after the above sequence has been completed, where DOWN key was depressed, causing the cursor 11 to the new cursor location 11a. It may be noticed that the cursor 11 disappears from the screen after the display is refreshed.

If it is determined at step S4 that the rotary operation device 2 has been activated, this may be detected by the rotary operation device activation detect means 4, which informs the player control section 5 of the current rotation speed of the rotary operation device 2. This rotation speed is previously defined as the average speed within a given time (step S5). At the player control section 5, it is assumed that the cursor moving speed corresponds to the rotation speed of the rotary operation device 2. By definition, therefore, the cursor may be moving the more quickly as the rotary operation device 2 is rotated the more quickly. The relationship between the rotation speed and cursor moving speed may be defined optionally, which may be overridden by the operator.

The current rotation direction may also be detected by the rotary operation activation detect means 4, which may provide its detect results to the player control section 5. At the player control section 5, the clockwise direction is defined as the forward rotation direction, and the counterclockwise direction is defined as the reverse rotation direction. This detect results may be used by the player control section 5 to determine whether the rotary operation device has been rotated forwardly or reversely (step S7).

If it is determined at step S7 that the rotary operation device 2 has been rotated in the forward direction, the cursor will be moved in the direction as indicated by the appropriate cursor key 1 (step S8). If it is determined at step S7 that the rotary operation device 2 has been rotated in the reverse direction, the cursor will be moved in the direction opposite the direction as indicated by the appropriate cursor key 1 (step Sb3).

The information that specifies the particular cursor moving direction and speed may be sent to the cursor movement instruction means 6, which generates the appropriate cursor movement instruction that will be passed to the display control means 7 via the player control means 5. In response to the cursor movement instruction, the display control means 7 may cause the cursor to move with increasing speed across the screen (step S9), and may refresh the current display if necessary (step S10). FIG. 4 shows the new display that has been refreshed after the above steps have been completed. The refreshed display shows that DOWN arrow key has been depressed, causing the cursor to move quickly to the new cursor location 1ib. It should be noted that the cursor 11 and the trace followed by the cursor 11 to the new location are disappeared after the display has been refreshed.

As the rotary operation device is rotated while holding any arrow key depressed, the cursor may be moving around in the direction of that arrow key, with the same speed as the rotary operation device is being rotated. When the rotary operation device is rotated in the opposite direction, the cursor may also be moving around in the opposite direction.

It may be readily understood that the operator may change the cursor moving direction and speed as desired, by adjusting the rotation direction and speed of the rotary operation device. The ease of operation may be enhanced in this way.

In the foregoing description, the operation that may be performed by the rotary operation device is limited to the cursor movement, but other operations may be performed, although those other operations have not been described specifically. It should be noted, however, that various types of processing may occur during the rotation operation, and that those types of processing are included in the scope of the present invention.

In this embodiment, it is described that DOWN arrow key is activated to cause the cursor to move downwardly, but other arrow keys such as UP, RIGHT and LEFT may be activated to cause the cursor to move in the direction of the respective arrow keys. In this case, the cursor movement may be controlled in the same manner as described above in connection with DOWN arrow key.

In this embodiment, the cursor moving speed may depend upon the rotation speed of the rotary operation device, but it may also depend upon the rotation amount of the rotary operation device. Furthermore, the cursor moving speed may depend upon both the rotation speed and rotation amount of the rotary operation device. The amount of cursor moving, that is, the distance over which the cursor should be moving, may also be controlled.

As described so far, the input device according to the present invention includes the cursor keys that, when activated, cause the cursor to move across the screen, the cursor key activation detect means that detect the activation of the cursor keys, the rotary operation device that, when activated, performs the input operations during its rotation, the rotary operation device activation detect means that detects when the rotary operation device is activated, and the cursor movement information generator means that responds to the respective detect results from the cursor key activation detect means and from the rotary operation device activation detect means, and may provide output signals that that cause the cursor to move as indicated by the detect results, depending upon whether only the cursor keys are activated or both the cursor keys and the rotary operation device are activated. Thus, the input device allows the user or operator to control the speed with which the cursor should be moving around or across the screen. That is, the cursor may be moved quickly or with any speed specified by the user or operator.

The information processing apparatus according to the present invention includes the input device as described above, and allows the user or operator to manipulate the cursor freely, and to cause the cursor to appear on the screen and navigate through the screen according to those manipulations.

The invention claimed is:

1. An input device including a set of cursor-movement keys (or simply cursor keys) that, when activated, cause the cursor to move at an initial speed across the screen in the direction as indicated by the cursor-movement key, a cursor key activation detect means for detecting the activation of any cursor key and outputting the detected result of the cursor key activation for the cursor movement in the direction as indicated, a rotary operation device being operable to be rotated in a clockwise direction and in a counterclockwise direction for performing the input operations through its rotation, a rotary operation device activation detect means for detecting the activation of the rotary operation device and outputting the detect result of the rotation amount or the rotation speed of the rotary operation device and the direction of rotation in which the rotary operation device has been rotated, that is, the clockwise direction or counterclockwise direction representing the forward direction and backward direction respectively, and a cursor movement information generator means for receiving the detect results from the cursor key activation detect means and from the rotary operation device activation detect means, wherein, when the detected result is received only from the cursor key activation detect means, the cursor movement information generator means responds to the received detect result, and provides output signals that cause the cursor to move in the respective direction indicated by the activated cursor key at an initial first speed, and when the detected results are received from both the cursor key activation detect means and the rotary operation activation detect means by the simultaneous operation of the cursor key and the rotary operation device, the cursor movement information generator means responds to the received detected result, and provides output signals such that when the rotary operation device is being rotated in the forward direction the output signals cause the cursor to continue to move in the respective direction indicated by the activated cursor key but at a second speed based upon modulating the first speed according to the rotation amount or the rotation speed of the rotary operation device and when the rotary operation device is rotated in the backward direction the output signals cause the cursor to move in the direction opposite the direction as indicated by the activated cursor key and at said second modulated speed according to the rotation amount or rotation speed of the rotary operation device.

2. The input device as defined in claim 1, wherein the set of cursor movement keys include several arrow keys that, when activated, cause the cursor to move in the respective directions as indicated by the arrow keys.

3. The input device as defined in claim 2, wherein the cursor movement information generator means responds to the detect results received from the cursor key activation detect means, and provides output signals that cause the cursor to move in the respective directions as indicated by the received detect results, and wherein, when the detect results are received both from the cursor key activation detect means and from the rotary operation activation detect means, the cursor movement information generator means responds to the received detect results, and provides the instructions that cause the cursor to move more quickly and/or more largely, as indicated by the received detect results.

4. The input device as defined in claim 1, wherein the cursor movement information generator means responds to the detect results received from the cursor key activation detect means, and provides output signals that cause the cursor to move in the respective directions as indicated by the received detect results, and wherein when the detect results are received both from the cursor key activation detect means and from the rotary operation activation detect means, the cursor movement information generator means responds to the received detect results, and provides the instructions that cause the cursor to move more quickly and/or more largely, as indicated by the received detect results.

5. The input device as defined in claim 4, wherein the speed with which the cursor is moving and/or the amount by which the cursor is moving become the quicker and/or larger as the rotary operation device is rotated the more quickly and/or more largely.

6. An information processing apparatus including:
(1) the input device having a set of cursor-movement keys (or simply cursor keys) that, when activated, cause the cursor to move across the screen, a cursor key activation detect means for detecting the activation of any cursor key, a rotary operation device being operable to be rotated in the clockwise direction and in the counterclockwise direction and for performing the input operations through its rotation, a rotary operation device activation detect means for detecting the activation of the rotary operation device and outputting the detect result of the rotation amount or the rotation speed of the rotary operation device and the direction of rotation in which the rotary operation device has been rotated, that is, the clockwise direction or counterclockwise direction representing the forward direction and backward direction respectively, and a cursor movement information generator means for receiving the detect results from the cursor key activation detect means and from the rotary operation device activation detect means, wherein, when the detected result is received only from the cursor key activation detect means, the cursor movement information generator means provides output signals that cause the cursor to move in the respective directions as indicated by the activated cursor key, and when the detected results are received from both the cursor key activation detect means and the rotary operation activation detect means by the simultaneous operation of the cursor key and the rotary operation device, the cursor movement information generator means provides output signals that cause the cursor to move in the respective directions as indicated by the activated cursor key when the rotary operation device is rotated in the forward direction, at the movement amount or movement speed as modulated to increase according to the rotation amount or rotation speed of the rotary operation device and provides output signals that cause the cursor to move in the direction opposite the direction as indicated by the activated cursor key at the movement amount or movement speed as modulated to increase according to the rotation amount or rotation speed of the rotary operation device when the rotary operation device is rotated in the backward direction;

(2) a display means that displays the cursor on the screen, together with the information such as text, characters, graphical images and the like; and (3) a cursor movement instructing means responsive to the output of the cursor movement information generator means included in the input device for providing instructions to the display means that cause the cursor to move on the screen.

7. The information processing apparatus as defined in claim 6, wherein the set of cursor movement keys include several arrow keys that, when activated, cause the cursor to move in the respective directions as indicated by the arrow keys.

8. The information processing apparatus as defined in claim 7, wherein the cursor movement information generator means responds to the detect results received from the cursor key activation detect means, and provides output signals that cause the cursor to move in the respective directions as indicated by the received detect results, and wherein, when the detect results are received both from the cursor key activation detect means and from the rotary operation activation detect means, the cursor movement information generator means responds to the received detect results, and provides the instructions that cause the cursor to move more quickly and/or more largely; as indicated by the received detect results.

9. The information processing apparatus as defined in claim 6, wherein the cursor movement information generator means responds to the detect results received from the cursor key activation detect means, and provides output signals that cause the cursor to move in the respective directions as indicated by the received detect results, and wherein, when the detect results are received both from the cursor key activation detect means and from the rotary operation activation detect means, the cursor movement information generator means responds to the received detect results, and provides the instructions that cause the cursor to move more quickly and/or more largely; as indicated by the received detect results.

10. The information processing apparatus as defined in claim 9, wherein the speed with which the cursor is moving and/or the amount by which the cursor is moving become the quicker and/or larger as the rotary operation device is rotated the more quickly and/or more largely.

11. A cursor display control method for controlling direction and speed of a cursor displayed on a display screen together with the information such as text characters, graphical images and the like using cursor keys alone or in combination with a rotary operation device comprising the steps of: detecting when only the cursor keys are activated to cause the cursor to move at an initial first speed in the respective direction indicated by the activated cursor key and, when it is determined at the detecting step that both the cursor keys and the rotary operation device are simultaneously activated and that the rotary operation device is being rotated in the forward direction causing the cursor to continue to move in the respective direction indicated by the activated cursor key and at a second speed based upon modulating the first speed according to the rotation amount or the rotation speed of the rotary operation device and when the rotary operation device is being rotated in the backward direction moving the cursor in the direction opposite the direction indicated by the activated cursor key and at said second modulated speed according to the rotation amount or rotation speed of the rotary operation device and refreshing the current display as the cursor is moving as instructed.

12. The cursor display control method as defined in claim 11, wherein when it is determined at the detecting step that the rotary operation device is rotated in the forward direction, the cursor is caused to move more quickly as determined by the operation of the rotary operation device, and when it is determined at the cursor moving step that the rotary operation device is rotated in the backward direction, the cursor is caused to move more quickly in the direction opposite the cursor movement direction as determined by the operation of the cursor key.

13. The cursor display control method as defined in claim 12, wherein the cursor is moving with the rotary motion of the rotary operation device, and is moving the more quickly as the rotary operation device is rotating the more quickly.

14. The cursor display control method as defined in claim 11, wherein the cursor is moving with the rotary motion of the rotary operation device, and is moving the more quickly as the rotary operation device is rotating the more quickly.

* * * * *